(12) United States Patent
Tanaka et al.

(10) Patent No.: US 7,808,736 B2
(45) Date of Patent: Oct. 5, 2010

(54) SERVO SIGNAL RECORDING APPARATUS, SERVO SIGNAL RECORDING METHOD, AND MAGNETIC TAPE

(75) Inventors: Kenji Tanaka, Osaka (JP); Kenichiro Yoshida, Osaka (JP); Masao Fujita, Osaka (JP); Sadamu Kuse, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 0 days.

(21) Appl. No.: 12/019,344

(22) Filed: Jan. 24, 2008

(65) Prior Publication Data

US 2008/0285171 A1 Nov. 20, 2008

(30) Foreign Application Priority Data

Jan. 25, 2007 (JP) ............................. 2007-015204

(51) Int. Cl.
*G11B 5/09* (2006.01)
*G11B 21/02* (2006.01)
*G11B 5/03* (2006.01)

(52) U.S. Cl. .............................. 360/48; 360/75; 360/66
(58) Field of Classification Search ........................ None
See application file for complete search history.

(56) References Cited

U.S. PATENT DOCUMENTS 5,689,384 A 11/1997 Albrecht et al.

| | | | |
|---|---|---|---|
| 2004/0208694 A1 | 10/2004 | Nakao | |
| 2006/0158771 A1* | 7/2006 | Nakao | 360/77.12 |
| 2007/0076319 A1* | 4/2007 | Takano et al. | 360/75 |
| 2008/0037166 A1* | 2/2008 | Dugas et al. | 360/118 |
| 2008/0186620 A1* | 8/2008 | Tateishi et al. | 360/77.12 |

FOREIGN PATENT DOCUMENTS

| | | |
|---|---|---|
| JP | 3-157802 A | 7/1991 |
| JP | 8-30942 A | 2/1996 |
| JP | 2004-318977 A | 11/2004 |

OTHER PUBLICATIONS

Hirano et al., Magnetic Recording System, Patent Abstract of Japan, Publication No. 03-157802, Jul. 5, 1991.*

* cited by examiner

*Primary Examiner*—Andrew L Sniezek
(74) *Attorney, Agent, or Firm*—Birch, Stewart, Kolasch & Birch, LLP

(57) ABSTRACT

A servo signal recording apparatus and servo-signal recording method for recording a servo signal on a magnetic tape that includes a magnetic layer having a data area capable of storing data and a servo area capable of storing a servo signal, the apparatus including a transportation unit for transporting the magnetic tape; a direct current (DC) erasing unit on a downstream side in a magnetic tape transportation direction that performs DC erasure to a surface layer portion of the magnetic layer by magnetization in a longitudinal direction of the magnetic tape; and a servo signal recording unit on a downstream side of the DC erasing unit in the magnetic tape transportation direction, that rubs against the magnetic layer of the magnetic tape, and records a servo signal in the servo area by magnetization in a direction opposite to a direction of the magnetization of the DC erasing unit.

5 Claims, 6 Drawing Sheets

SERVO SIGNAL RECORDING APPARATUS, SERVO SIGNAL RECORDING METHOD, AND MAGNETIC TAPE

BACKGROUND OF THE INVENTION

1. Field of the Invention

The present invention relates to a servo signal recording apparatus and a servo signal recording method capable of recording at least a servo signal on a magnetic tape. The present invention relates to, for example, a servo writer and a servo head unit. The present invention also relates to a magnetic tape on which a servo signal is recorded.

2. Description of Related Art

Magnetic tapes find various applications such as an audio tape, a video tape, and a computer tape. Particularly, in the field of a tape for a data backup used for a data backup of a computer, tapes with a storage capacity of hundreds of gigabytes per volume have been commercialized along with the increase in capacity of a hard disk in which a backup is to be created. In the future, the increase in capacity of a backup tape is indispensable for dealing with the further increase in capacity of a hard disk.

Along with the increase in capacity of a magnetic tape, there is a demand for high-density recording with respect to a magnetic tape. Examples of the high-density recording include a technique of recording data on a magnetic tape while shortening the recording wavelength of the data (technique of shortening a wavelength) and a technique of recording data on a magnetic tape while narrowing a track width to be recorded on the magnetic tape (technique of narrowing a track). According to the above technique of shortening a wavelength, the thickness of a magnetic layer of a magnetic tape tends to be small in order to shorten the recording wavelength of data and reduce the influence of a diamagnetic field. Furthermore, according to the technique of narrowing a track, a head for recording/reproducing data is controlled so as to follow a recording track exactly by a tracking servo (e.g., see Patent Document 1 (JP 8 (1996)-30942 A)).

However, when the thickness of a magnetic layer is reduced as described above, the output of a servo signal decreases to lower the signal/noise (S/N) ratio thereof which makes it difficult to perform exact tracking servo.

As a method for overcoming the above problem, a method for substantially doubling a servo output by demagnetizing a magnetic recording medium with a direct current (DC) before recording a servo signal on the magnetic recording medium has been proposed (e.g., see Patent Documents 1 and 2 (JP 2004-318977 A)).

According to the above configurations disclosed in Patent Documents 1 and 2, the output of a servo signal increases, whereby the S/N ratio thereof can be ensured. Furthermore, the magnetic layer can be DC-demagnetized sufficiently over the entire thickness thereof, using a wide gap erasing head with a gap length of 1 µm or more.

However, according to the configurations disclosed in Patent Documents 1 and 2, in the case where data with a short wavelength is recorded on a magnetic layer that has been DC-erased, although a data signal is recorded in an upper layer portion of the magnetic layer, a DC-erased magnetization area remains in a lower layer portion of the magnetic layer. Therefore, the S/N ratio of a data signal is lowered due to a DC erasing noise caused by a DC magnetization component, or so-called asymmetry of a reproduced waveform is caused by the change in a residual magnetization amount depending upon the magnetization direction of a data signal, which degrades an error rate.

FIGS. 7A and 7B schematically show a recorded state of a servo signal and data in a magnetic tape 9 viewed from a side. FIG. 7A schematically shows a recorded state of a servo signal in a servo track of the magnetic tape 9. FIG. 7B schematically shows a recorded state of data in a data track of the magnetic tape 9. In FIGS. 7A and 7B, an arrow X represents a magnetization direction of a magnetization area 103 of a servo signal, an arrow Y represents a magnetization direction of a DC-erased magnetization area 104, and arrows A and B are magnetization directions of respective data areas 105 and 106. The recording wavelength of a servo signal is large, so that a magnetic flux reaches a lower layer 102 during recording of a servo signal with a large recording wavelength, and a magnetization area 103 is formed up to a deepest portion of the magnetic layer 101, as shown in FIG. 7A. Thus, the DC-erased magnetization area 104 is overwritten completely. However, as shown in FIG. 7B, the magnetization areas 105 and 106 based on the recording of a data signal are formed in a surface layer portion of the magnetic layer 101 since the recording wavelength of a data signal is small. Therefore, the DC-erased magnetization area 104 remains in a lower portion of the magnetization areas 105 and 106. Thus, the above problem arises.

SUMMARY OF THE INVENTION

Therefore, with the foregoing in mind, it is an object of the present invention to provide a servo signal recording apparatus, a servo signal recording method, and a magnetic tape, in which the S/N ratio of a servo signal can be ensured by increasing the output of the servo signal without the decrease in the S/N ratio of a data signal and the degradation in an error rate.

A servo signal recording apparatus of the present invention records a servo signal on a magnetic tape that includes a magnetic layer having a data area capable of storing data and a servo area capable of storing a servo signal. The apparatus includes a transportation unit that winds the magnetic tape unwound from a supply reel around a take-up reel and transporting the magnetic tape, a DC erasing unit that is placed on a downstream side in a magnetic tape transportation direction and performs DC erasure with respect to a surface layer portion of the magnetic layer by magnetization in a longitudinal direction of the magnetic tape, and a servo signal recording unit that is placed on a downstream side of the DC erasing unit in the magnetic tape transportation direction, rubs against the magnetic layer of the magnetic tape, and records a servo signal in the servo area by magnetization in a direction opposite to a direction of the magnetization of the DC erasing unit.

A servo signal recording method of the present invention is a method for recording a servo signal on a magnetic tape that includes a magnetic layer having a data area capable of storing data and a servo area capable of storing a servo signal. The method includes a DC erasing process of performing DC erasure with respect to a surface layer portion of the magnetic layer of the magnetic tape by magnetization in a longitudinal direction of the magnetic tape, and a servo signal recording process of recording a servo signal in the servo area of the magnetic tape by magnetization in a direction opposite to a direction of the magnetization in the DC erasing process, after the DC erasing process.

A magnetic tape of the present invention includes a magnetic layer having a data area capable of storing data and a servo area capable of recording a servo signal, wherein a surface layer portion of the magnetic layer is subjected to DC erasure by magnetization in a longitudinal direction of the magnetic tape, and a servo signal is recorded by magnetization in a direction opposite to a direction of the magnetization of the DC erasure.

According to the present invention, the S/N ratio of data to be recorded can be prevented from being lowered, and an error rate of the data can be prevented from being degraded.

DETAILED DESCRIPTION OF THE INVENTION

The servo signal recording apparatus of the present invention can be configured in such a manner that the DC erasing unit performs DC erasure up to a depth or less at which the data is recorded in a thickness direction from the surface of the magnetic tape. According to this configuration, a magnetization area that has been DC-erased by the DC erasing unit can be overwritten in a magnetization area of data during recording of a servo signal, so that the output of the servo signal can be increased. Furthermore, only a surface layer portion of a magnetic layer is magnetized by DC erasure, so that a portion magnetized by DC erasure during recording of data is overwritten. Thus, the S/N ratio of data can be prevented from being lowered due to the DC erasing noise caused by a DC component during reproduction of data. Furthermore, the asymmetry of a reproduced waveform is suppressed from occurring due to the change in a residual magnetization amount depending upon the magnetization direction of a magnetization area formed during recording of data, and an error rate can be prevented from being degraded.

Furthermore, when the DC erasing unit is composed of a DC erasing head, the thickness of the magnetic layer of the magnetic tape is 50 to 100 nm, and the coercive force of the magnetic tape is 150 to 300 kA/m, the gap length of the DC erasing head can be set to be in a range of 0.1 to 0.5 µm.

Furthermore, according to the servo signal recording method of the present invention, the depth of a surface layer portion of the magnetic layer to be DC-erased during the DC erasure process can be set to be a depth or less at which the data is recorded.

Furthermore, according to the DC erasure process, a magnetic tape with a magnetic layer thickness of 50 to 100 nm and a coercive force of 150 to 300 kA/m can be DC-erased by a DC erasing head with a gap length in a range of 0.1 to 0.5 µm.

Furthermore, the magnetic tape of the present invention can be DC-erased up to a depth or less at which the data is recorded in a thickness direction from the surface of the magnetic layer.

Embodiment 1

1. Configuration and Operation of a Servo Signal Recording Apparatus

Figure 1:
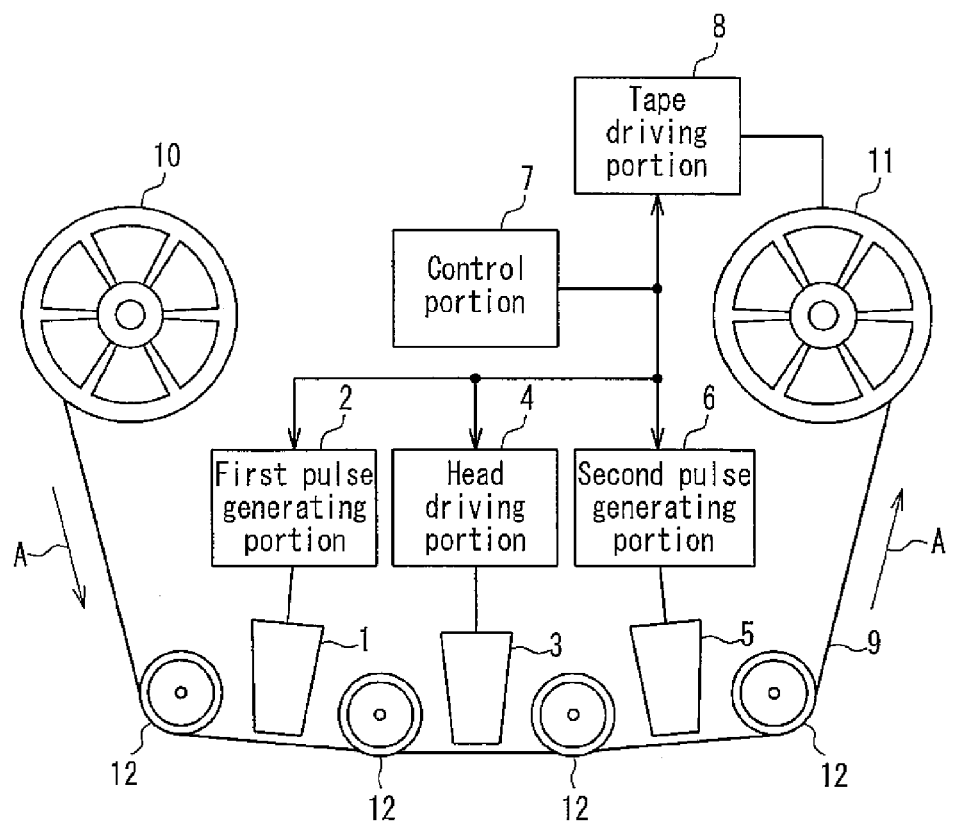
FIG. 1 is a block diagram showing a configuration of a servo signal recording apparatus in Embodiment 1.

FIG. 1 is a schematic view of a servo signal recording apparatus according to Embodiment 1. As shown in FIG. 1, the servo signal recording apparatus includes an alternating current (AC) erasing head 1, a first pulse generating portion 2, a DC erasing head 3, a head driving portion 4, a servo write head 5, a second pulse generating portion 6, a control portion 7, a tape driving portion 8, a first reel 10, a second reel 11, and guide rollers 12.

The AC erasing head 1 magnetically AC-erases information recorded on a magnetic layer of a magnetic tape 9 based on a pulse generated by the first pulse generating portion 2. The AC erasing head 1 is an example of the AC erasing unit.

The first pulse generating portion 2 generates a pulse for operating the AC erasing head 1 by the control from the control portion 7.

The DC erasing head 3 magnetically DC-erases information recorded on the magnetic layer of the magnetic tape 9 with a control signal output from the head driving portion 4. The DC erasing head 3 is an example of the DC erasing unit.

The head driving portion 4 outputs a control signal to the DC erasing head 3 by the control from the control portion 7.

The servo write head 5 magnetically records a servo signal in a servo band in the magnetic tape 9 based on a pulse generated by the second pulse generating portion 6. The servo write head 5 is an example of the servo signal recording unit.

The second pulse generating portion 6 generates a pulse for recording a servo signal in the servo write head 5 by the control from the control portion 7.

The control portion 7 controls the operations of the first pulse generating portion 2, the head driving portion 4, the second pulse generating portion 6, and the tape driving portion 8. Specifically when a servo signal is written on the magnetic tape 9, the control portion 7 outputs an instruction of erasing information recorded on the magnetic tape 9 with respect to the first pulse generating portion 2 and the head driving portion 4, outputs an instruction of recording a servo signal with respect to the second pulse generating portion 6, and outputs an instruction of rotating the second reel 11 with respect to the tape driving portion 8.

The tape driving portion 8 rotates the second reel 11 based on the control from the control portion 7. By rotating the second reel 11, the magnetic tape 9 sent out from the first reel 10 can be wound around the second reel 11 via a predetermined tape path.

One end side and the other end side of the magnetic tape 9 respectively are wound around the first reel 10 and the second reel 11. When the second reel 11 is rotated by the tape driving portion 8, the magnetic tape 9 sent out from the first reel 10 is wound around the second reel 11. The tape driving portion 8, the first reel 10, and the second reel 11 are examples of the transportation unit. The first reel 10 is an example of the take-up reel or supply reel, and the second reel 11 is an example of the supply reel or take-up reel.

The guide rollers 12 are placed on respective tape input sides and tape output sides of the AC erasing head 1, the DC erasing head 3, and the servo write head 5. The guide rollers 12 regulate the position of the magnetic tape 9 so that the magnetic tape 9 runs on a sliding surface of each head.

Next, the operation of the above servo signal recording apparatus will be described.

When a servo signal is recorded on the magnetic tape 9, the magnetic tape 9 first is allowed to run in a direction represented by an arrow A. In the magnetic tape 9 unwound from the first reel 10, the magnetic layer is AC-erased by the AC erasing head 1.

Next, the magnetic tape 9 that has been AC-erased by the AC erasing head 1 is DC-erased with a magnetization force in a longitudinal direction of the magnetic tape 9. Specifically, the DC erasing head 3 magnetizes the magnetic layer of the magnetic tape 9 in a predetermined magnetization direction.

Next, a servo signal is recorded on the DC-erased magnetic tape 9 by the servo write head 5. Specifically, the servo write head 5 magnetizes a servo band in the magnetic tape 9 with a magnetization force in a direction opposite to the magnetization direction of the DC erasing head 3, and records a servo signal.

Figure 2A:
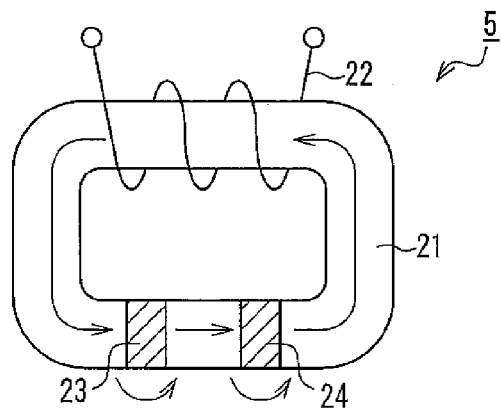
FIG. 2A is a schematic plan view showing a configuration of a servo write head in Embodiment 1.
Figure 2B:
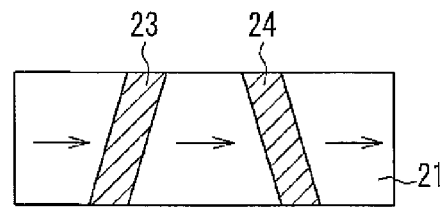
FIG. 2B is a schematic view showing a configuration of the servo write head in Embodiment 1.

FIGS. 2A and 2B are schematic views showing a configuration of the servo write head 5. FIG. 2A is a plan view of the servo write head 5, and FIG. 2B is a view showing the tape sliding surface in the servo write head 5. As shown in FIGS. 2A and 2B, the servo write head 5 includes a core 21, a coil 22 wound around a part of the core 21, and a pair of gaps 23 and 24 formed in a part of the core 21. As shown in FIG. 2B, the gaps 23 and 24 are formed substantially in a chevron shape so as to be inclined in directions opposed to each other with a predetermined azimuth angle. By applying a current to the coil 22 shown in FIG. 2A, a magnetic flux is generated in a direction represented by an arrow in the figure. The magnetic layer of the magnetic tape 9 placed so as to be opposed to the gaps 23 and 24 is magnetized with the magnetic flux generated in the vicinity of the gaps 23 and 24, whereby information can be recorded. As shown in FIG. 2B, the gaps 23 and 24 of the servo write head 5 are formed so as to be inclined with an azimuth angle, so that a stripe formed in the servo band also is formed so as to be inclined with respect to the magnetic tape running direction.

Figure 3A:
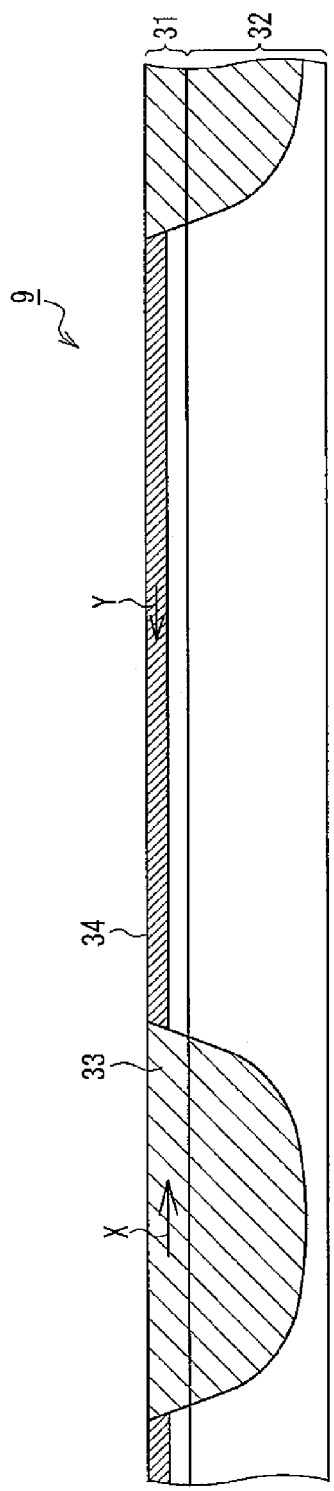
FIG. 3A is a schematic view showing a magnetization state with respect to a magnetic tape in Embodiment 1.
Figure 3B:
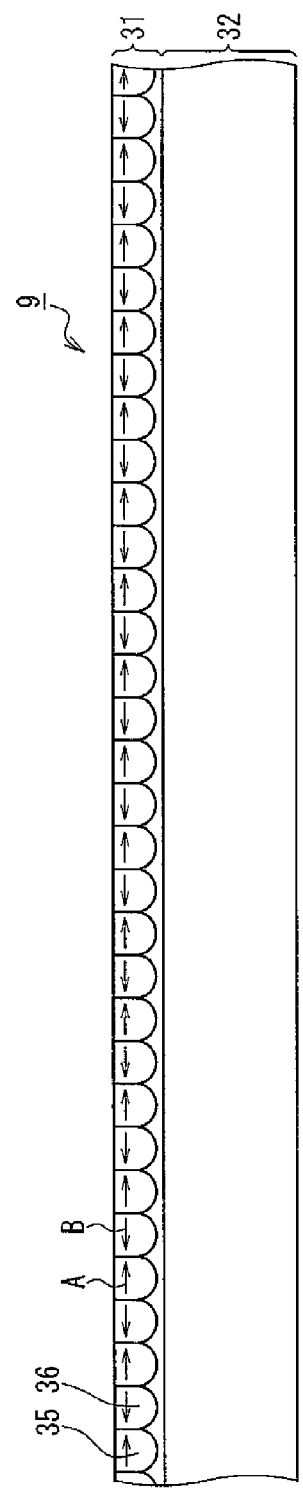
FIG. 3B is a schematic view showing a magnetization state with respect to the magnetic tape in Embodiment 1.

FIGS. 3A and 3B schematically show the magnetization state of the magnetic tape 9 viewed from a side. In FIGS. 3A and 3B, the magnetic tape 9 has a configuration in which a magnetic layer 31 made of a magnetic material is formed on a lower layer 32 formed of a non-magnetic material. The thickness of the magnetic layer 31 is formed thin so as to reduce the influence of a diamagnetic field along with the shortening of the wavelength of data to be recorded. Furthermore, as shown in FIGS. 3A and 3B, when the DC erasing head 3 magnetizes the magnetic layer 31 so as to perform DC erasure with respect to the AC-erased magnetic layer 31, only a surface layer portion of the magnetic layer 31 is magnetized, and a thin magnetization area 34 is formed. The magnetization area 34 is formed so that the depth thereof from the surface of the magnetic layer 31 is equal to or less than the depth of the magnetization areas 35 and 36 from the surface of the magnetic layer 31 shown in FIG. 3B.

FIG. 3A is a view schematically showing a recorded state of a servo signal in a servo track of the magnetic tape 9. As shown in FIG. 3A, the magnetization area 33 is recorded (magnetized) by the servo write head 5, and corresponds to an area in which a servo signal is recorded. The magnetization direction of the magnetization area 33 is represented by an arrow X. The magnetization area 34 is DC-erased by the DC erasing head 3. The magnetization direction of the magnetization area 34 is represented by an arrow Y.

As shown in FIG. 3A, the servo write head 5 magnetizes the magnetic layer 31 that has been DC-erased by the DC erasing head 3 as represented by the magnetization area 33. A servo signal (i.e., a pulse output from the second pulse generating portion 6) has a large wavelength, so that the length of the magnetic tape of the magnetization area 33 in a longitudinal direction is large, and the magnetization area 33 is formed to a deepest portion of the magnetic layer 31, whereby the magnetization area 34 (DC component) is overwritten completely. In FIG. 3A, although the magnetization area 33 is formed so as to reach the lower layer 32, the lower layer 32 is not magnetized actually since it is made of a non-magnetic material. In the present embodiment, the wavelength of a servo signal is 5 µm, and the length of the magnetization area 33 is about 2.1 µm. This enables a servo signal to be recorded on the magnetic tape 9.

As shown in FIG. 3A, magnetization inversion occurs between the magnetization area 33 and the magnetization area 34, so that the level of a servo signal increases during reproduction of a servo signal (in the case where magnetization by DC erasure is not performed, magnetization inversion does not occur at an end of the magnetization area 33, so that the level of a servo signal to be reproduced is small). Since the output of a servo signal can be increased, a tracking servo can be performed exactly.

FIG. 3B is a view schematically showing a recorded state of data in a data track of the magnetic tape 9. As shown in FIG. 3B, the magnetization areas 35 and 36 are magnetized by a head for recording data (not shown), and are formed during recording of data with respect to the magnetic tape 9. The magnetization area 35 has a magnetization direction represented by an arrow A, and the magnetization area 36 has a magnetization direction represented by an arrow B. Furthermore, the magnetization area 35 and the magnetization area 36 are formed alternately in a longitudinal direction of the magnetic tape 9.

As shown in FIG. 3B, when data is recorded on the magnetic tape 9 on which the magnetization area 34 is formed by DC erasure, the magnetization areas 35 and 36 are formed. As described above, the magnetization area 34 is formed so that the thickness thereof from the surface of the magnetic layer 31 is equal to or less than that of the magnetization areas 35 and 36, so that the magnetization area 34 is overwritten with the magnetization areas 35 and 36. Furthermore, in the lower layer 32 side of the magnetization areas 35 and 36, the magnetization area 34 does not remain.

Thus, the DC erasing noise caused by a DC component does not occur when data recorded on the magnetic tape 9 is reproduced, so that the S/N ratio of the data can be enhanced. Furthermore, asymmetry of a reproduced waveform caused by the change in a residual magnetization amount depending upon the magnetization direction of data can be eliminated, and an error rate can be enhanced.

2. Method for Forming the Magnetization Area 34 by DC Erasure

Next, a method for forming the magnetization area 34 by DC erasure as shown in FIGS. 3A and 3B will be described.

Figure 4:
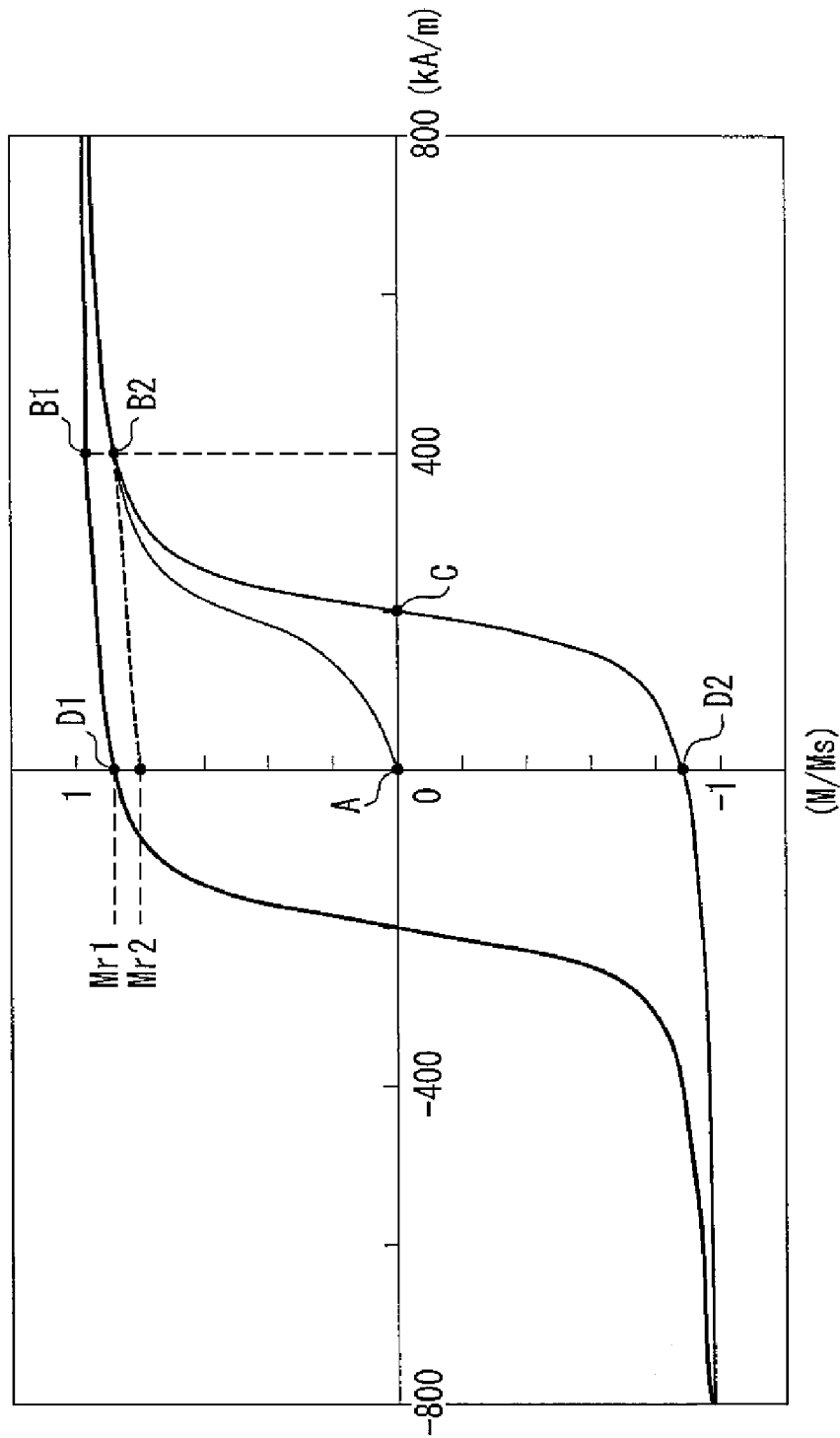
FIG. 4 is a characteristic diagram showing a relationship between the magnetization required for erasing a magnetization area formed by a DC erasing head and the coercive force of a magnetic layer in Embodiment 1.

FIG. 4 shows a relationship between the intensity of a magnetic field (X-axis) and the magnetization of the magnetic layer 31 (Y-axis) required for erasing the magnetization area 34 formed by the DC erasing head 3. Furthermore, the characteristics in FIG. 4 show a hysteresis loop of a magnetic tape with a coercive force Hc of 200 kA/m and a square shape ratio Br/Bm of 0.88. In FIG. 4, "A" represents a value in an AC-erased state, "C" represents a value corresponding to the coercive force Hc of the magnetic layer, B1 and B2 represent magnetization of a magnetic layer when the intensity of a magnetic field of a magnetic head is 400 kA/m (i.e., 2Hc), D1 and D2 represent values in a DC-erased state, and Mr1 and Mr2 represent residual magnetization.

As shown in FIG. 4, when a DC-erased magnetic layer (value D1 or D2) is supplied with a magnetic field of 400 kA/m that is twice Hc, the area magnetized by the DC erasing head 3 can be erased.

Figure 5:
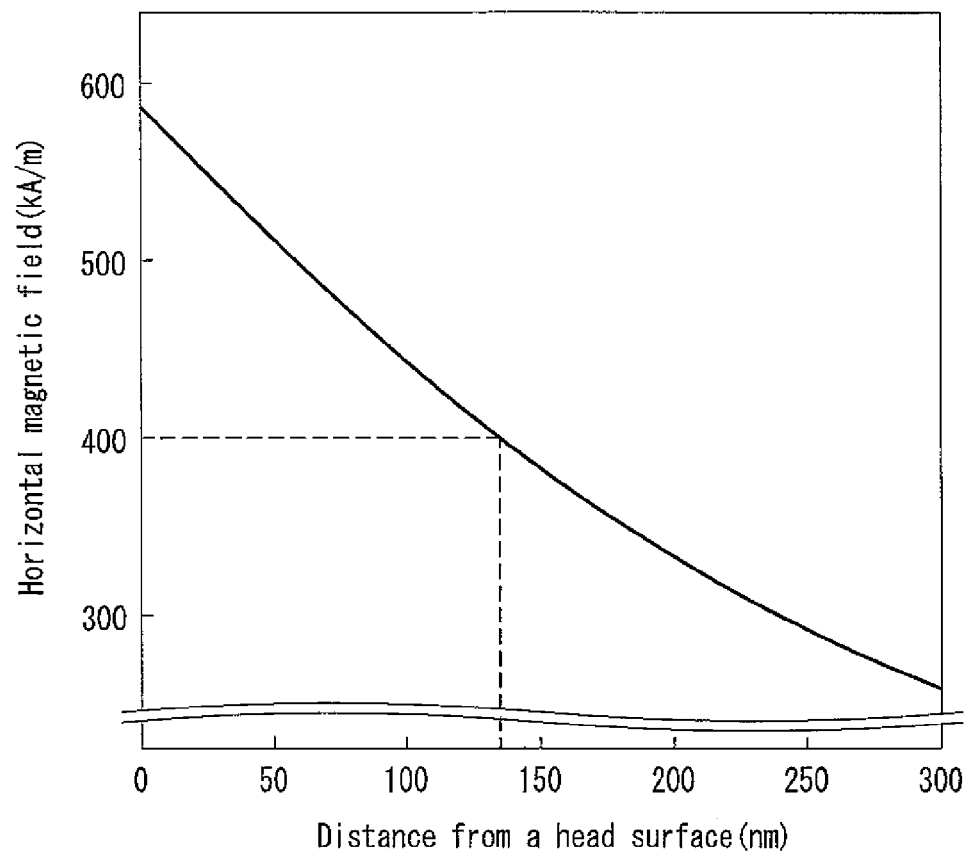
FIG. 5 is a characteristic diagram showing a relationship between the horizontal magnetic field of the DC erasing head and the distance from the surface of the DC erasing head in Embodiment 1.

FIG. 5 is a graph showing a relationship between the intensity of a horizontal magnetic field generated during recording of a data signal by a head for recording data and the distance from the surface (sliding surface) of the head for recording data. The exemplary characteristic shown in FIG. 5 shows the distance from the surface of the head for recording data and the intensity of the horizontal magnetic field in the case where the head for recording data with a gap length of 0.5 μm is used, and the recording current value is 25 mA. As shown in FIG. 5, in this case, the magnetic field of 400 kA/m is applied to the magnetic layer in a range of 135 nm from the surface (sliding surface) of the head for recording data Assuming that the gap between the surface of the head for recording data and the surface of the magnetic tape 9 is about 50 nm, the magnetic field of 400 kA/m is applied up to a depth of about 85 nm from the surface of the magnetic tape 9. Thus, if the depth of the magnetization area 34 formed by the DC erasing head 3 (see FIG. 3A, etc.) from the surface of the magnetic tape 9 is set to be 85 nm or less, the S/N ratio of data can be enhanced, and an error rate can be reduced as described above.

Figure 6:
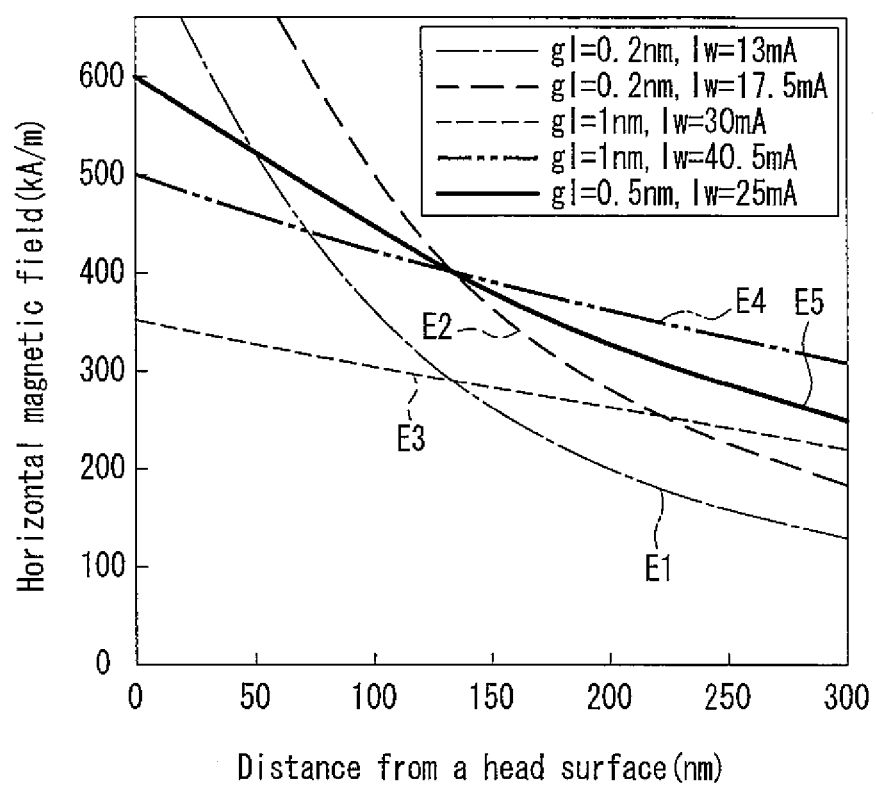
FIG. 6 is a characteristic diagram showing a relationship between the horizontal magnetic field of the DC erasing head and the distance from the surface of the DC erasing head in Embodiment 1.
Figure 7A:
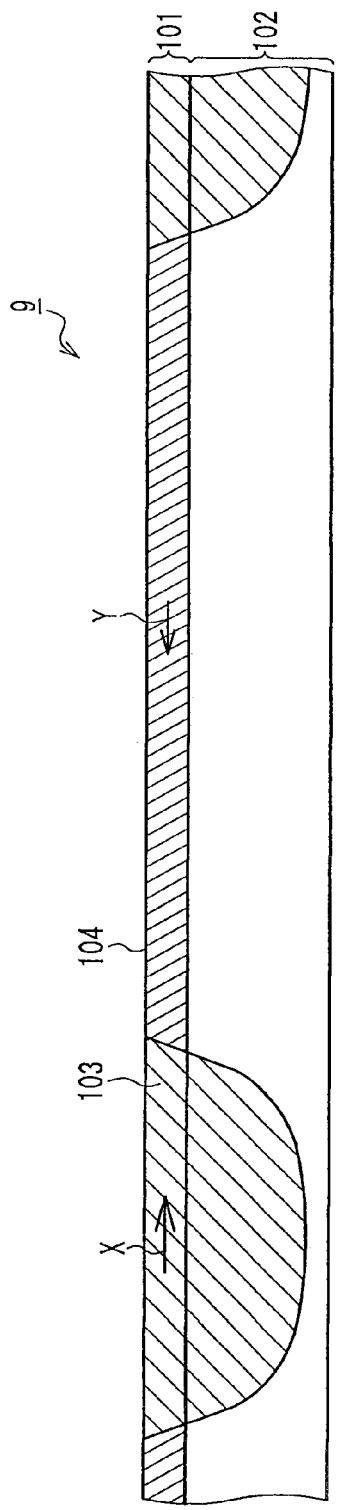
FIG. 7A is a schematic view showing a magnetization state with respect to a conventional magnetic tape.
Figure 7B:
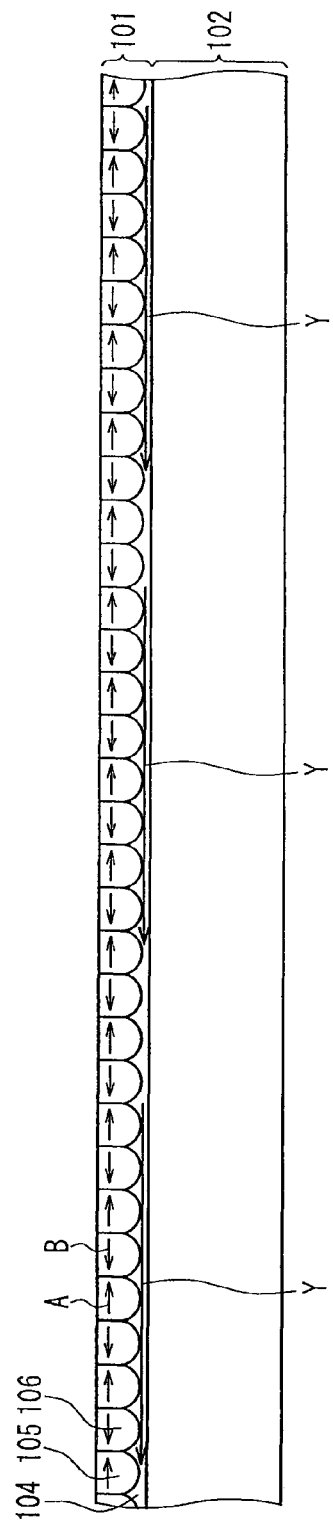
FIG. 7B is a schematic view showing a magnetization state with respect to the conventional magnetic tape.

Next, in order to form the magnetization area 34 by DC erasure up to a depth of 85 nm or less from the surface of the magnetic tape 9, the gap length of the DC erasing head 3 may be optimized. FIG. 6 shows a relationship between the intensity of a horizontal magnetic field of the DC erasing head 3 and the distance from the surface of the DC erasing head 3. A plurality of curves in FIG. 6 show results obtained by preparing 5 patterns (E1 to E5) of combinations of a gap length and a recording current, and measuring a magnetic field distribution in a thickness direction of a magnetic tape in each pattern.

As shown in FIG. 6, E1 and E2 represent the characteristics of a magnetic head (0.2 μm) with a small gap length. In E1 (13 mA) with a low recording current, the intensity of a horizontal magnetic field does not satisfy 400 kA/m at a position of 135 nm from the surface of the magnetic head. On the other hand, in E2 (17.5 mA) with a high recording current, the intensity of a horizontal magnetic field is 400 kA/m at a position of 135 nm from the surface of the magnetic head Furthermore, E3 and E4 are characteristics of a magnetic head (1 μm) with a large gap length. In E3 (30 mA) with a low recording current, the intensity of a horizontal magnetic field does not satisfy 400 kA/m at a position of 135 nm from the surface of the magnetic head. On the other hand, in E4 (40.5 mA) with a high recording current, the intensity of a horizontal magnetic field is 400 kA/m at a position of 135 nm from the surface of the magnetic head. Furthermore, E5 represents the characteristics of the head for recording data, and the gap length thereof is set to be 0.5 μm.

As shown in FIG. 6, when a magnetic head having a gap length smaller than that of the head for recording data (E5) is used as a DC erasing head, the slope of the magnetic field distribution in a tape thickness direction becomes steep, which is suitable for DC-erasing only a surface layer portion of the magnetic layer. In FIG. 6, E1 and E2 are preferred. Furthermore, the recording current is set so that the intensity of a horizontal magnetic field is 400 kA/m or less at a position of 135 nm from the surface of the magnetic head. Thus, in E1, the intensity of a horizontal magnetic field does not satisfy 400 kA/m at a position of 135 nm due to a low recording current; however, the intensity of a horizontal magnetic field can be set to be 400 kA/m at a position of 135 nm by setting the recording current to be high as represented by E2. Thus, E2 in FIG. 6 is the most preferred specification of a magnetic head.

In the present embodiment, a servo signal was written on an LTO3 tape (designed for Ultrium3 of a LTO specification) manufactured by Hitachi Maxell, Ltd. by the servo signal recording apparatus shown in FIG. 1, and the output and the S/N ratio of a servo signal, the S/N ratio of a data signal, and an error rate were measured using a magnetic head mounted on a commercially available LTO3 drive. Table 1 shows the characteristics in the case where the gap length of a DC erasing head is changed (Examples 1-6), the characteristics in the case where data is recorded on a magnetic tape that has been subjected to only AC erasure (Comparative Example 1), and the characteristics in the case where data is recorded on a magnetic tape in which an entire magnetic layer has been DC-erased by a DC erasing head with a large gap length (Comparative Example 2).

TABLE 1

| | AC erasure | DC erasure gap length (μm) | Servo Output (%) | S/N ratio (dB) | Error rate | Remark |
|---|---|---|---|---|---|---|
| Example 1 | Yes | 0.1 | 120 | 1 | 7.E−06 | |
| Example 2 | Yes | 0.2 | 135 | 1.5 | 3.E−07 | |
| Example 3 | Yes | 0.3 | 150 | 2 | 1.E−07 | |
| Example 4 | Yes | 0.4 | 165 | 2.3 | 2.E−07 | |
| Example 5 | Yes | 0.5 | 180 | 2.6 | 5.E−07 | |
| Example 6 | Yes | 0.6 | 190 | 2.8 | 1.E−06 | |
| Comparative Example 1 | Yes | — | 100 | 0 | 1.E−04 | AC erasure |
| Comparative Example 2 | Yes | 2 | 200 | 3 | 1.E−05 | DC erasure |

As shown in Table 1, in the case of Comparative Example 1, since magnetization inversion does not occur in a servo signal, a high output cannot be obtained. Furthermore, in the case of Comparative Example 2, although a high output of a servo signal can be obtained, a DC component remains, so that an error rate is high On the other hand, in Examples 1-6, the output of a servo signal, the S/N ratio of the servo signal, and an error rate fall in allowable ranges. In particular, the results in Examples 1-5 are preferred.

The inventors of the present invention conducted various experiments, and as a result, found the following: generally, in order to obtain a horizontal magnetic field intensity of 400%/m at a position of 135 nm from the surface of a magnetic head in a magnetic tape (thickness of a magnetic layer: 50 to 100 nm, coercive force: 150 to 300 kA/m) used for a data backup tape of a computer, the gap length of a DC erasing head preferably is set to be 0.1 to 0.5 μm.

Thus, by setting the gap length of a DC erasing head in a range of 0.1 to 0.5 μm, the output and the S/N ratio of a servo signal, and an error rate can be placed in allowable ranges.

3. Effects of Embodiments, etc

According to the present embodiment, a magnetic layer is AC-erased, a surface layer portion of the magnetic layer is DC-erased, and then, a servo signal is recorded in a servo band with a magnetization force in a direction opposite to the direction of a magnetization force in the DC erasing process, whereby the output of the servo signal can be increased.

Furthermore, only a surface layer portion of the magnetic layer is magnetized by DC erasure, so that a portion magnetized by DC erasure during recording of data is overwritten. Thus, during reproduction of data, the S/N ratio of data can be prevented from decreasing due to a DC erasing noise caused by a DC component. Furthermore, asymmetry of a reproduced waveform is suppressed from being caused by the change in a residual magnetization amount depending upon the magnetization direction of a magnetization area formed during recording of data, and an error rate can be prevented from being degraded.

In the present embodiment, the configuration in which a magnetic layer is AC-erased, and then, a surface layer portion of the magnetic layer is DC-erased has been illustrated as a preferred example. However, the magnetic layer is not necessarily required to be AC-erased before being DC erased. Even in the configuration, for example, in which only DC erasure is performed with respect to an unused magnetic tape that is not magnetized, the effects similar to those in the present embodiment can be obtained.

The head tracking servo method of the present invention is useful for a data storage system for a computer using a magnetic tape as an information medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A servo signal recording apparatus for recording a servo signal on a magnetic tape that includes a magnetic layer and a non-magnetic layer, the magnetic layer having a data area capable of storing data and a servo area capable of storing a servo signal, comprising:
   a transportation unit that winds the magnetic tape unwound from a supply reel around a take-up reel and transporting the magnetic tape;
   a DC erasing unit that is placed on a downstream side in a magnetic tape transportation direction and performs DC erasure with respect to a surface layer portion of the magnetic layer by magnetization in a longitudinal direction of the magnetic tape; and
   a servo signal recording unit that is placed on a downstream side of the DC erasing unit in the magnetic tape transportation direction, rubs against the magnetic layer of the magnetic tape, and records a servo signal in the servo area by magnetization in a direction opposite to a direction of the magnetization of the DC erasing unit,
   wherein the DC erasing unit forms a magnetization area having a depth smaller than that of an area magnetized during recording of the data, in a thickness direction from a surface of the magnetic layer.

2. The servo signal recording apparatus according to claim 1, wherein the DC erasing unit contains a DC erasing head, and
   when a thickness of the magnetic layer of the magnetic tape is 50 to 100 nm, and a coercive force of the magnetic tape is 150 to 300 kA/m, a gap length of the DC erasing head is in a range of 0.1 to 0.5 µm.

3. A method for recording a servo signal on a magnetic tape that includes a magnetic layer and a non-magnetic layer, the magnetic layer having a data area capable of storing data and a servo area capable of storing a servo signal, comprising:
   a DC erasing process of performing DC erasure with respect to a surface layer portion of the magnetic layer of the magnetic tape by magnetization in a longitudinal direction of the magnetic tape; and
   a servo signal recording process of recording a servo signal in the servo area of the magnetic tape by magnetization in a direction opposite to a direction of the magnetization in the DC erasing process, after the DC erasing process,
   wherein in the DC erasing process, a magnetization area having a depth smaller than that of an area magnetized during recording of the data is formed in a thickness direction from a surface of the magnetic layer.

4. The method for recording a servo signal according to claim 3, wherein in the DC erasing process, the magnetic tape with a thickness of the magnetic layer of 50 to 100 nm and a coercive force of 150 to 300 kA/m is subjected to DC erasure with a DC erasing head having a gap length in a range of 0.1 to 0.5 µm.

5. A magnetic tape comprising a magnetic layer and a non-magnetic layer, the magnetic layer having a data area capable of storing data and a servo area capable of recording a servo signal,
   wherein a magnetization area formed by DC erasure has a depth smaller than that of an area magnetized during recording of the data by magnetization in a longitudinal direction of the magnetic tape in a thickness direction from a surface of the magnetic layer, and
   a servo signal is recorded by magnetization in a direction opposite to a direction of the magnetization of the DC erasure.

* * * * *